Oct. 10, 1961      B. BARÉNYI      3,003,809
STREAMLINED MOTOR VEHICLE BODY
Filed Jan. 23, 1957      2 Sheets-Sheet 1
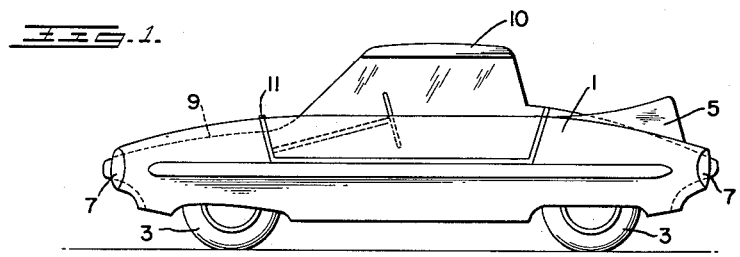
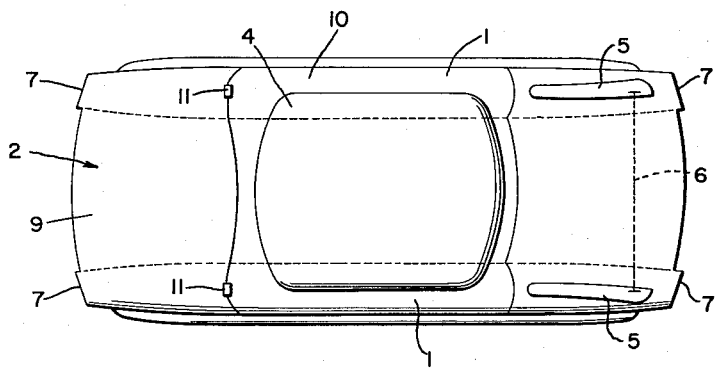
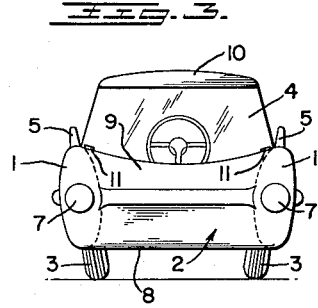 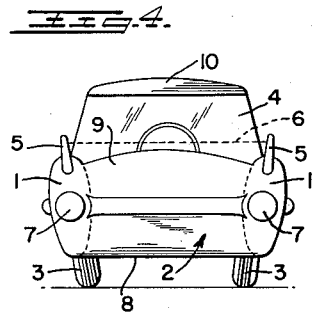
INVENTOR
BÉLA BARÉNYI
BY
ATTORNEYS Oct. 10, 1961   B. BARENYI   3,003,809
STREAMLINED MOTOR VEHICLE BODY
Filed Jan. 23, 1957   2 Sheets-Sheet 2
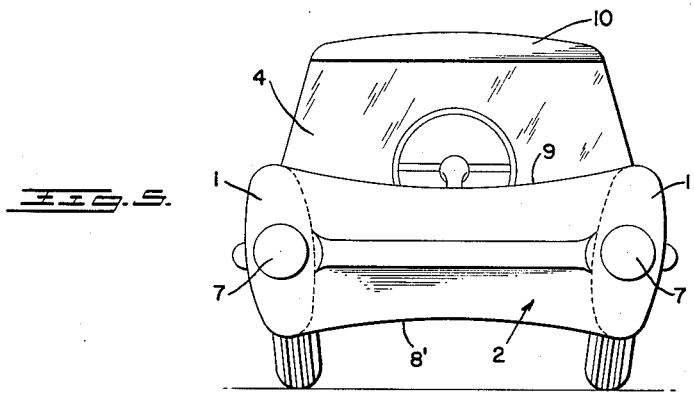
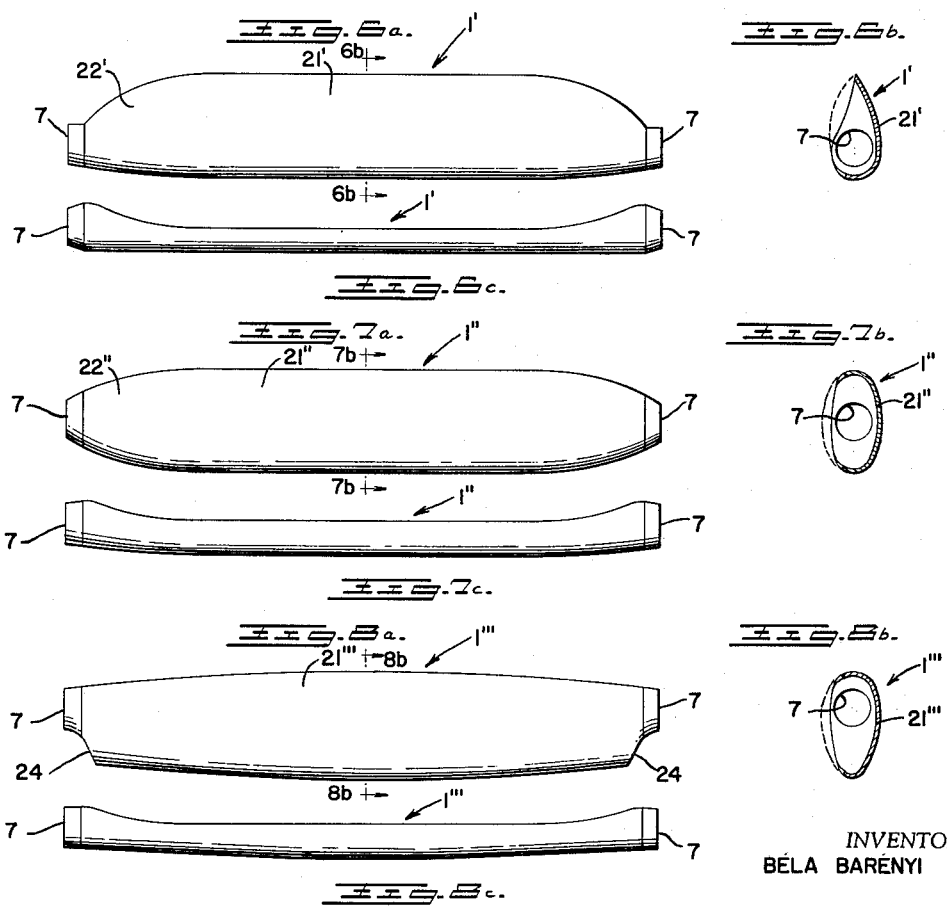
INVENTOR
BÉLA BARENYI
BY Dicke and Craig
ATTORNEYS United States Patent Office 3,003,809
Patented Oct. 10, 1961

3,003,809
STREAMLINED MOTOR VEHICLE BODY
Béla Barényi, Stuttgart-Vaihingen, Germany, assignor to Daimler-Benz Aktiengesellschaft, Stuttgart-Untertürkheim, Germany
Filed Jan. 23, 1957, Ser. No. 635,796
Claims priority, application Germany Apr. 7, 1951
4 Claims. (Cl. 296—28)

The present application is a continuation-in-part application of my copending application Serial No. 279,997, filed April 2, 1952, and now abandoned, entitled "Motor Vehicle With Streamlined Contour."

The present invention relates to a motor vehicle with a streamlined body and more particularly to such a motor vehicle the vehicle body of which is built or made up in the main or two narrow side body members and a wide central body between the two side body members. The three sections of the body consisting of the two side members and of the central member extend substantially over the entire length of the vehicle, and are rigidly connected with one another in any suitable conventional manner. The upper part of the wheels is also covered up by the outer panels of the two side body members.

According to the present invention the interior space of the vehicle structure can be advantageously enlarged without increasing the weight of the vehicle body by arranging the two side bodies with a lateral inclination. This inclination is preferably chosen corresponding to or essentially parallel with the angle of inclination of the road wheels.

The side body members preferably have basically an elliptical or approximately elliptical cross section or part thereof, but they may also have any other suitable cross section. The cross section of the side body members may also have the shape of a drop or an oval, the tapered end of which may be directed upwardly or downwardly as may be the case.

The contour and design of the vehicle structure according to the present invention allows great latitude insofar as the forming and shaping of the body members are concerned. In practice, the side body members are formed so as to taper toward the ends, the tapers or transitions being preferably curved, while sections of the side body members between the tapers may extend rectilinearly. However, the side body members may also be curved in the longitudinal and transverse directions over the entire extent thereof. In this connection the two side walls may also extend essentially parallel by curving the external side wall convexly and the internal side wall or any portion thereof concavely.

According to the present invention, the ends of the side body members may be so constructed as to be closed by a circular or approximately circular disk in front and in the rear of the vehicle. Such closure may be arranged practically on a narrow ring-shaped base. The center of the closure disk may be located both on the longitudinal axis of the side body members or above or below the same.

Stabilizing fins may be provided at the rear ends of the side body members to enable a favorable installation of an aerial for wireless sets.

With a vehicle structure consisting of the two side body members and a central body a favorable space utilization, along with a good view for the driver, may be obtained in that the central body member is formed differently in front of the passenger space and therebehind, and in that the upper panel thereof is curved concavely in front of the passenger space and convexly behind the same. The floor of the central body member is appropriately plane, but it may also be concavely curved so as to thereby increase the ground clearance of the vehicle. The central body member forms a continuous, uninterrupted smooth contour together with the two side body members in that the upper panel and bottom plates or the floor thereof extend tangentially into the walls forming the side body members. The vehicle structure may, however, also be formed so that the transition gradates between the top and the bottom plates of the central body and the side body members, for example, by providing definite steps.

Accordingly, it is an object of the present invention to provide a motor vehicle body which consists of a relatively small number of relatively large, integrally formed body parts which may be readily manufactured.

Another object of the present invention is the provision of a motor vehicle body which is simple, inexpensive in manufacture and easy to assemble.

Still another object of the present invention resides in the provision of a motor vehicle body which consists of a plurality of body parts having a shape requiring relatively simple dies in the manufacture thereof.

Still another object of the present invention is the provision of a motor vehicle body which provides a relatively large passenger compartment without increase in weight.

These and other objects, features, and advantages of the present invention will become more obvious from the following description when taken in connection with the accompanying drawing which shows, for purposes of illustration only, several embodiments in accordance with the present invention and wherein:

FIGURE 1 is a side elevational view of a motor vehicle body in accordance with the present invention;

FIGURE 2 is a top plan view of the motor vehicle body shown in FIGURE 1;

FIGURE 3 is a front view of the motor vehicle body shown in FIGURES 1 and 2;

FIGURE 4 is a rear view of the motor vehicle body shown in FIGURES 1 and 2;

FIGURE 5 is a front view, partially in section, of still another embodiment of a vehicle body structure in accordance with the present invention;

FIGURE 6a is a side elevational view of the basic construction of a side body member of a modified embodiment in accordance with the present invention;

FIGURE 6b is a cross-sectional view taken along line 6b—6b of FIGURE 6a;

FIGURE 6c is a top plan view of the side body members shown in FIGURE 6a;

FIGURES 7a, 7b, and 7c are side elevational, cross-sectional, and top plan views, respectively, of the basic construction of another embodiment of a side body member in accordance with the present invention; and FIGURES 8a, 8b and 8c are side elevational cross-sectional and top plan views, respectively, of the basic construction of still another embodiment of a side body member in accordance with the present invention.

Basically, the vehicle body in accordance with the present invention consists of three main body parts, namely, two side body members and a broad middle or central body part formed by a floor and an upper panel spaced from each other between the two side body members. All body parts extend over essentially the entire length of the vehicle and are formed of relatively simple geometrical shapes to facilitate manufacture thereof. In particular, the side body members are formed as portions of closed hollow-shaped body parts of simple geometrical configuration as will be described more fully hereinafter.

Referring now to the drawing wherein like reference numerals are used throughout the various views to designate like parts, and more particularly to FIGURES 1 to 4 thereof, reference numeral 1 designates the two side body members whereas reference numeral 2 generally designates the central body member. The side body members 1 surround the road wheels 3 at least in part by the outer panels thereof while the central body 2 together with the side body members and the hood-like roof part 10 enclose and define the passenger space 4 therebetween. Stabilizing fins 5 are provided on the rear end of the side body members 1. An aerial 6 may be spanned between the stabilizing fins 5 across the rear end of the vehicle.

The side body members 1 are closed at the ends thereof by circular or approximately circular disks 7 which are arranged essentially vertical but may also be inclined, if so desired.

The side body members 1 are arranged with a predetermined side inclination, namely upwardly outwardly, preferably coinciding substantially with the angle of inclination of the road wheels 3 to increase the passenger space 4 available in the vehicle without increase of the vehicle body weight.

In practice, the central body generally designated by reference numeral 2 may be provided with a plane bottom plate 8 extending along the level of the lower surface of the side body members 1 with which the plane bottom plate 8 merges smoothly. The central body 2 further includes an upper panel 9 which in the part of the central body 2 in front of the passenger space 4 is preferably curved concavely while in the rear part thereof convexly. The end parts as well as the lateral edges of the panel members 8 and 9 of the central body 2 are formed so that both the bottom plate 8 and the upper panel 9 extend essentially tangentially into the side bodies 1.

Moreover, these members 8 and 9 may have any desired profile, as illustrated, for example, in the embodiment according to FIGURE 5 in which the bottom plate 8' is illustrated as being covex.

If so desired, instead of providing a smooth transition between the various body members 1, 8, and 9, steps may also be provided at the transition at the bottom plate 8 and upper panel 9 of the central body 2 with the side body member 1.

A hood-like roof member 10 which is pivoted in pivots 11 along the forward edge covers the passenger compartment. By pivoting the hood-like member 10 in the manner illustrated ready access to the vehicle may be obtained for the passenger by tilting the member 10 upwardly. The hood-like member may be made of any suitable material such as metal and glass panes which include the necessary window areas forming the windshield and rear window as well as side windows to provide proper visibility for the driver. However, the hood-like member 10 may also be formed completely of plastic material so that any or all parts thereof which extend above the other body walls 1 and 9 may be made of transparent material to increase the visibility for the driver. Furthermore, any suitable locking and release mechanism may be provided for the hood-like member 10.

The various body parts are also connected with each other in any conventional manner, for example, by means of welding bolts, riveting, etc. For that purpose, the various body parts may be provided with appropriate connecting portions such as flanges, collars, etc., or may be provided with a predetermined amount of overlap at the places of connection as is conventional for purposes of effecting any conventional appropriate joint between the various body parts of the present invention.

Moreover, the various body parts, in particular the upper panel 9, may be provided with appropriate conventional lids to provide accessibility of the engine and trunk compartments. Such openings may be formed in a simple manner by cutting out certain parts of the vehicle body during the shaping thereof and covering up such openings with lids of appropriate configuration which may be suitably hinged. However, since such openings do not form any part of the present invention, and are of conventional construction, they are not illustrated herein.

The vehicle body in accordance with the present invention may be of the self-supporting type or may be mounted in any conventional manner on a suitable frame or superstructure, for example, on a frame with longitudinal and cross bearer members or with outriggers. Any suitable frame may be used, if so desired, even though the vehicle body because of its particular construction offers a certain amount of inherent rigidity.

The side body members are formed as parts of simple geometrical closed hollow members, for example, such as elliptical members as illustrated in FIGURES 1 to 4 wherein the outline of the ellipse is completed by dotted lines.

FIGURES 6a, 6b, and 6c; FIGURES 7a, 7b and 7c; as well as FIGURES 8a, 8b and 8c show different embodiments of the basic construction of the side body members.

In the basic embodiment according to FIGURES 6, 6b and 6c, and FIGURES 7a, 7b and 7c, the side body members generally designated by reference numerals 1' and 1'', respectively consist of an intermediate part 21' and 21'' and tapered end parts 22' and 22'', these intermediate parts being connected to their respective end parts by arched transition portions as shown in these figures. The two opposite ends of the side body members 1' and 1'' are closed by disks 7 which are seated on a ring-shaped base in the embodiment according to FIGURES 6a, 6b and 6c.

In the basic embodiments in which the side body members have a drop-shaped cross section, the tapering portions are so formed that the center of the closing disks 7 are located below the longitudinal axis as illustrated in FIGURES 6a, 6b and 6c. In the case of the embodiments according to FIGURES 7a, 7b and 7c, the side body members 1'' have an elliptical cross section which is symmetrically formed not only with respect to the vertical but also with respect to the horizontal line so that the center of the closing disks 7 are located along a longitudinal axis.

In the basic embodiment illustrated in FIGURES 8a, 8b and 8c, the side body member 1''' has a drop-shaped cross section, the tapered end of which is directed downwardly and is symmetrically curved convexly both in the transverse and in the longitudinal axis. The closing disks 7 in that case closely adjoin the upper edge of each side body member 1''' and the connection with the lower edge thereof is brought about by a profiled transition 24 so that the center of the closing disks 7 is located above the longitudinal axis.

Instead of forming the side body members symmetrical in relation to the vertical lines, the end parts thereof may also be formed non-symmetrically, and the two closing disks may be arranged at any desired different height.

While I have shown and described several embodiments in accordance with the present invention, it is understood that the same is not limited thereto but is susceptible of many changes and modifications in accordance with the present invention, and I intend to cover all such changes and modifications as encompassed by the appended claims.

I claim:
1. In a passenger motor vehicle, a streamlined body consisting of three separate main body parts including two hollow side members extending over the entire length of said vehicle, and further including a middle part comprising a floor and upper panel means having front and rear sections, said front and rear sections and said two side members defining a passenger compartment, each one of said side members comprising end portions connected by an intermediate part forming in cross-sectional view a portion of a closed geometrical body and comprising upper, lower, and side wall portions, each of said wall portions being curved as viewed in transverse cross section and being disposed symmetrically with respect to the longitudinal axis of said one of said side members, each of said end portions comprising a wall portion symmetrically tapered with respect to said axis as seen in side view, said hollow side members having an inclination upwardly and outwardly from said floor to define a space in said passenger compartment wider than said floor, said space being limited on each side of said vehicle by said side wall portions, said vehicle having front and rear cambered wheels, each said hollow side member covering the upper portions of the ones of said wheels on a respective side of said vehicle, the said inclination of said hollow side members being in accordance with the camber of said wheels.

2. In a passenger motor vehicle, the combination according to claim 1, wherein said symmetrically tapered wall portion terminates in a circular wall defining a circular aperture, closure means for said aperture comprising a disc, said longitudinal axis intersecting the centers of said aperture and said disc of each of said end portions.

3. In a passenger motor vehicle, according to claim 1, wherein said intermediate part of each hollow side member is of a cross-section corresponding to a portion of an ellipse.

4. In a passenger motor vehicle, the combination according to claim 1, wherein said front section is in tangential engagement with said upper wall portion of each said intermediate part and said floor is in tangential engagement with said lower wall portion of each said intermediate part.

References Cited in the file of this patent

UNITED STATES PATENTS

| D. 166,833 | Thompson | May 20, 1952 |
| D. 167,905 | Muller | Oct. 7, 1952 |
| 1,202,859 | Ledwinka | Oct. 31, 1916 |
| 1,541,837 | Maise | June 16, 1925 |
| 1,953,515 | Smith | Apr. 3, 1934 |
| 2,254,497 | Schafer | Sept. 2, 1941 |

FOREIGN PATENTS

| 1,049,109 | France | Aug. 12, 1953 |
| 511,518 | Great Britain | Aug. 21, 1939 |
| 550,603 | Great Britain | Jan. 15, 1943 |
| 443,274 | Italy | Dec. 15, 1948 |